E. M. BICKERSTAFF.
LIME AND FERTILIZER DISTRIBUTER.
APPLICATION FILED MAR. 29, 1910. RENEWED DEC. 5, 1910.
981,160.
Patented Jan. 10, 1911.
2 SHEETS—SHEET 1.
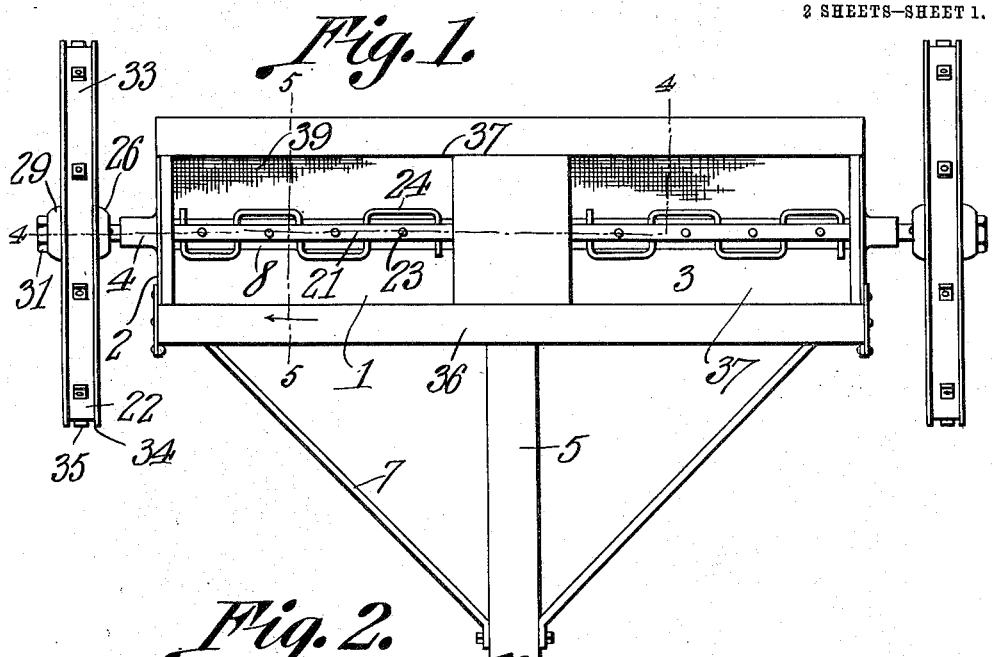
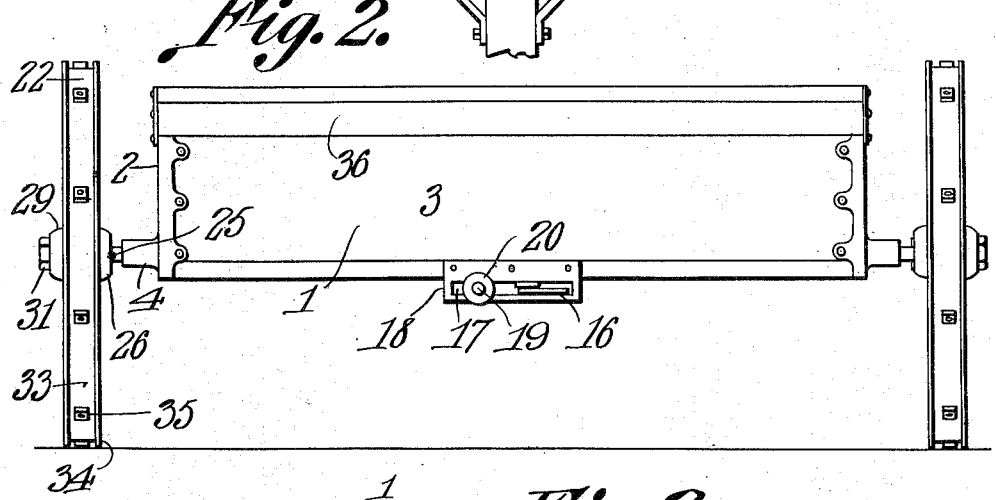
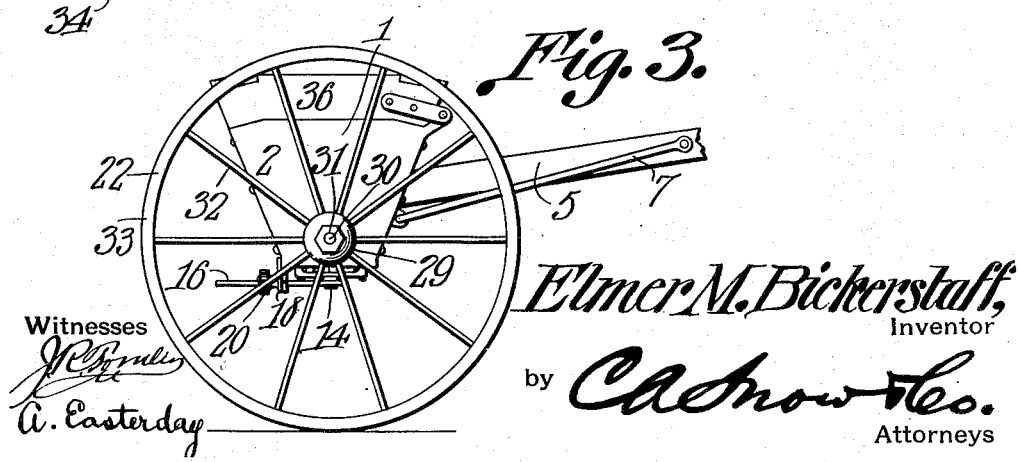
Elmer M. Bickerstaff,
Inventor
Witnesses
by C. A. Snow & Co.
Attorneys

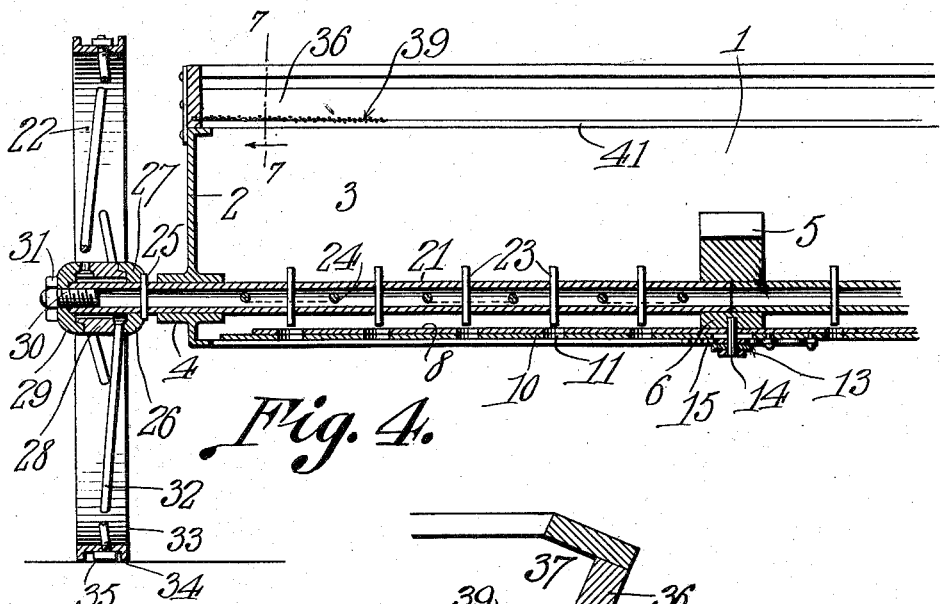
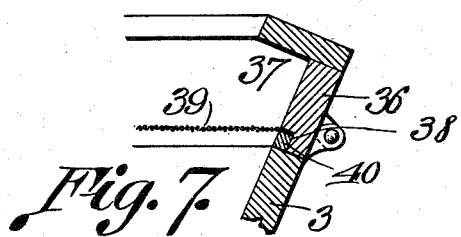
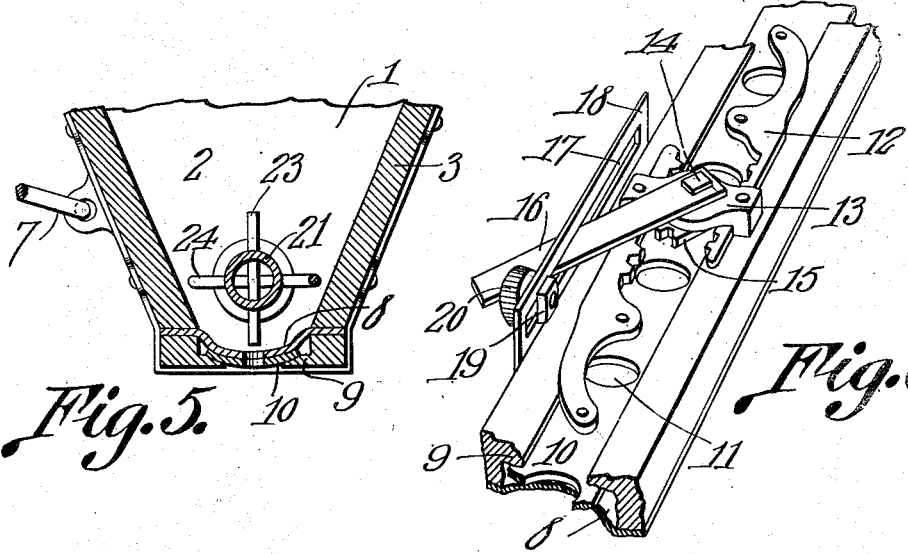
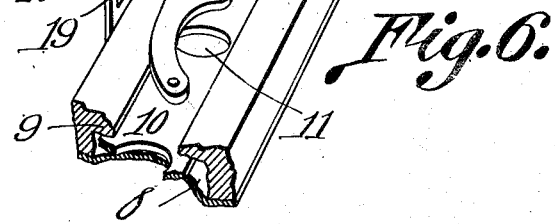

UNITED STATES PATENT OFFICE.

ELMER M. BICKERSTAFF, OF COCHRANTON, PENNSYLVANIA.

LIME AND FERTILIZER DISTRIBUTER.

981,160.  Specification of Letters Patent.  Patented Jan. 10, 1911.

Application filed March 29, 1910, Serial No. 552,134. Renewed December 5, 1910. Serial No. 595,736.

*To all whom it may concern:*

Be it known that I, ELMER M. BICKERSTAFF, a citizen of the United States, residing at Cochranton, in the county of Crawford and State of Pennsylvania, have invented a new and useful Lime and Fertilizer Distributer, of which the following is a specification.

This invention relates to a lime and fertilizer sower of the broadcast type and consists in the novel construction and arrangement of its parts as hereinafter shown and described.

The object of the invention is to provide a light and durable sower of the character indicated which is adapted to evenly and speedily distribute lime, fertilizer and the like and in a manner calculated to produce satisfactory results when the said material is turned under the soil.

With the above object in view the machine includes a hopper which is mounted upon axle sections that meet or abut at their inner ends. Wheels of peculiar construction and especially adapted to be used on a machine of this kind are fixed to the outer end portions of the said axle sections and a draft tongue is provided at its rear end with a bearing which receives the meeting end portions of the said axle sections. The said axle sections are journaled in the ends of the hopper and the hopper is provided in its bottom with a perforated plate under which a series of perforated plates or valves are adapted to operate. A lever mechanism is provided for moving the said valves in order that the passage ways through the said perforations may be increased as desired. The axle sections are provided with stirrers and lump breakers of peculiar configuration and peculiar relation to the perforated bottom of the hopper. A combined cover and screen is hingedly attached to the hopper and when in position over the hopper may be conveniently used as a screen for removing foreign bodies from the material as it is placed in the hopper. After the hopper has been properly charged with material the said cover may be swung over upon its hinges and thus the foreign bodies retained upon the top of the cover are passed off.

In the drawings,—Figure 1 is a top plan view of the sower. Fig. 2 is a rear elevation of the same. Fig. 3 is a side elevation of the same. Fig. 4 is a longitudinal sectional view of a portion of the same cut on the line 4—4 of Fig. 1. Fig. 5 is a transverse sectional view of a portion of the same cut on the line 5—5 of Fig. 1. Fig. 6 is a perspective view of a portion of the same. Fig. 7 is a detail sectional view of a portion of the cover of the same cut on the line 7—7 of Fig. 4.

The lime and fertilizer sower consists of a hopper 1 which includes metallic end pieces 2 and wooden side pieces 3. The end pieces 2 are provided with bearings 4. A tongue 5 passes at its rear end portion through the forward side piece 3 and is provided with a bearing 6. Braces 7 are connected at their rear ends to the forward edges of the end pieces 2 of the hopper 1 and at their forward ends are connected with the rear portions of the tongue 5. The hopper 1 is provided with a perforated bottom 8 which is concaved or approximately semi-cylindrical. Guides 9 are fixed to the front and rear portions of the bottom of the hopper 1 and lie under the perforated bottom plates 8. Valve strips 10 are located at their edge portions in the guides 9 and lie under the bottom plate 8 of the hopper. The said strips 10 are provided with perforations 11 which at times are adapted to be brought into register with the perforations in the bottom plates 8 of the hopper.

Means is provided for moving the valve strips 10 so that their perforations may be brought into register or nearly so with the perforations in the bottom plate 8 and said means preferably consists of a rack bar 12 attached to each strip and having their rack or teeth portions opposite each other and overlapping each other longitudinally of the bottom of the hopper. A spider 13 is secured at its opposite ends to the opposite guides 9 and also serves as means for receiving the overlapping portions of the rack bars 12. An arbor 14 is journaled in the spider 13 and at its upper end is provided with a gear disk 15 which meshes with the teeth of the rack bars 12. A lever 16 is fixed to the arbor 14 and extends rearwardly and passes through an elongated opening 17 in a plate 18 attached to the rear side of the hopper 1. A pin 19 is also located in the opening 17 and is provided with a clamp nut 20 by means of which after the said pin has been adjusted to a desired position in the said opening 17 it may be fixed by tightening the said nut 20 thereon. By adjusting the pin 19 in the opening 17 and securing the same to the plate 18 in the manner as indicated the extent of the swinging movement of the lever 16 may be limited or prescribed and consequently when the lever is swung into engagement with the said pin it will indicate that the valve strips have been moved to such an extent as to bring their perforations 11 into a proper or predetermined relation with the perforations in the bottom 8 of the hopper 1. By such an arrangement it will be seen that the flow of the material from the hopper may be regulated to a nicety.

Axle sections 21 are journaled at their inner ends in the bearings at the rear end of the tongue and at their outer end portions in the bearings 4 provided in the end pieces 2 of the hopper 1. The said axle sections 21 are in alinement with each other and a supporting wheel 22 is fixed to the outer end portion of each of the said sections. The axle sections 21 are preferably made of pipe or tubing and each said section is provided with a series of transversely disposed pins 23 and a beater or disintegrator 24. The said beaters or disintegrators are formed from wire or rods and are passed at regular intervals transversely through the sections 21 and have intermediate portions spaced from the sides of the said sections, the spaced sections at one side of the axle section being between the ends of the spaced sections at the opposite sides thereof. The pins 23 and disintegrators 24 operate in and through the material carried by the hopper 1 just above the bottom plate 8 and are designed to effectually agitate the material and reduce any lumps that it should contain to a pulverized or powdered state. The axle sections 21 are provided at points beyond the ends of the hopper 1 with transversely disposed pins 25. The hub of each wheel 22 consists of three pieces, namely an inner plate 26 having recesses 27 adapted to receive one of the pins 25 and an intermediate portion 28 and an outer portion 29. Threaded pins 30 are fixed to the axle sections 21 and project beyond the ends thereof. The inner plates 26 of the hub receive the outer portions of the axle section 21 as do also the intermediate portions 28 but the outer plates 29 receive the pins 30 only. Axle nuts 31 are screwthreaded upon the pin 30 and bear against the outer plates 29 and serve to keep the parts of the hub in proper position with relation to each other.

Spokes 32 are engaged at their inner ends with the intermediate hub portion 28 and at their outer ends pass through a tire 33 made preferably from channel iron. The side flanges 34 of the said tire are outwardly disposed and nuts 35 are screw threaded upon the outer ends of the spokes 32 and lie between the flanges 34 of the tire 33. In each wheel 32 the spokes 22 are in staggered relation. By so connecting the outer ends of the spokes with the wheel rims the peripheries of the rims are roughened to such an extent to insure frictional contact between the rims of the wheels 22 and the ground as to cause the said wheels to rotate their respective axle shafts 21.

A combined cover and screen 36 is hinged at one edge to the forward side piece 3 of the hopper 1 and at the upper edge thereof. The frame of the cover 36 is provided with openings 37 which are rabbeted at their inner edges as at 38. Screens 39 are located at their edges in the rabbets 38 and are secured therein by means of beads 40 or their equivalent.

When the cover 36 is in position over the top of the hopper 1 the material to be placed in the hopper is thrown upon the screen 39 and the finer particles of material will sift down through the meshes of the screen into the body of the hopper 1. Any lumps that the material may contain will remain upon the top of the said screen 39 and may be reduced by hand or otherwise and be passed into the hopper as indicated. Any foreign bodies as for instance stone or the like will remain upon the top of the screen and when they have been accumulated thereon in sufficient quantities the said cover may be swung upon its hinges whereby the said foreign bodies will be cast off.

Thus it will be seen that a simple device is provided for distributing in a broadcast manner powdered or similar material in quantities that may be predetermined and that therefore the device that has been described is especially adapted for depositing lime and fertilizer upon the soil in beneficial quantities and at proper intervals.

Having described the invention, what I claim as new and desire to secure by Letters Patent is:—

1. A distributer comprising a hopper having end pieces and side pieces, a draft tongue passing through the forward side piece and attached to the rear side piece, braces connected at their forward ends with the tongue and connected at their rear ends with the end pieces of the hopper, axle sections journaled at their inner ends to the tongue and at their outer portions in the end pieces of the hopper, traction wheels fixed to the outer ends of the axle sections, stirrers carried by the axle sections, said hopper having a perforated bottom located below the axle sections.

2. A distributer comprising a hopper consisting of side pieces and end pieces and a perforated bottom, a tongue passing through the forward side piece and secured to the rear side piece of the hopper and having a bearing, braces connected at their forward ends with the tongue and at the rear ends with the end pieces of the hopper, axle sections journaled at their inner ends in the bearing of the tongue and at their outer portions in the end pieces of the hopper, traction wheels fixed to the outer ends of the axle sections, stirrers carried by the axle sections and located over the bottom of the hopper, and adjustable valves located under the bottom of the hopper and adapted to be moved to increase or diminish the transverse area of the openings through the bottom of the hopper.

3. A distributer consisting of a hopper having side pieces, end pieces and a perforated bottom, a tongue passing through the forward side piece and secured to the rear side piece of the hopper and having a bearing located within the hopper, braces connected at their forward ends with the tongue and at their rear ends with the end pieces of the hopper, axle sections journaled at their inner ends in the bearings carried by the tongue and at their outer end portions in the end pieces of the hopper, traction wheels fixed to the outer ends of the axle sections, stirrers carried by the axle sections and located within the hopper over the perforated bottom thereof, guides located under the bottom of the hopper, perforated valve strips located in the guides, a lever mechanism for moving the guide strips to increase or diminish the transverse area of the perforations in the bottom of the hopper.

4. A distributer comprising a hopper having side pieces and end pieces, a tongue passing through the forward side piece and having a bearing, braces connecting the said tongues with the end pieces of the hopper, axle sections journaled at their inner ends in the bearing carried by the tongue and journaled at their outer portions in the end pieces of the hopper, traction wheels fixed to the projecting ends of the axle sections, said hopper having a perforated bottom, stirrers carried by the axle sections and located within the hopper over the perforated bottom thereof and means for increasing or decreasing the transverse area of the perforations in the bottom of the hopper.

In testimony that I claim the foregoing as my own, I have hereto affixed my signature in the presence of two witnesses.

ELMER M. BICKERSTAFF.

Witnesses:
FRANK B. OCHSENREITER,
C. E. DOYLE.